United States Patent Office 3,267,171
Patented August 16, 1966

3,267,171
PROCESS FOR FORMING OLEFINS BY
HYDROGEN TRANSFER
William Judson Mattox, Baton Rouge, La., assignor to
Esso Research and Engineering Company, a corporation of Delaware
No Drawing. Filed Feb. 18, 1965, Ser. No. 433,811
11 Claims. (Cl. 260—683.3)

The present invention relates in general to an aluminosilicate catalyst for use in a process for the transfer of combined hydrogen from one type of hydrocarbon to another type of hydrocarbon. More particularly, the present invention relates to a process of converting a hydrocarbon having at least three carbon atoms per molecule and containing non-aromatic carbon-to-hydrogen bonds to a different hydrocarbon having a higher carbon-to-hydrogen ratio by interaction with a hydrogen-accepting olefin in the presence of aluminosilicate catalysts containing cations of metals selected from Groups IB through VIII of the Periodic Table.

It has been found that the conversion of a hydrocarbon having at least three carbon atoms per molecule can be effected by adding to the charged hydrocarbon a substantial amount of a hydrogen-accepting olefin in the presence of a suitable catalyst. The olefin utilized is ultimately converted to a saturated hydrocarbon by addition of the hydrogen removed from the charged hydrocarbon while the latter is converted in the process to a compound having a higher carbon-to-hydrogen ratio. This conversion of hydrocarbons to compounds having a higher carbon-to-hydrogen ratio is desirable since the starting materials utilized are presently available in both quantity and quality at low cost. The advantage of this accomplishment is readily apparent if one considers the value of almost complete utilization of the gaseous by-products encountered from both the straight and the destructive distillation of petroleum.

While the conversion of hydrocarbons to olefins by hydrogen transfer, without the concurrent cracking and other side reactions, is highly desirable, it has been found that certain undesirable features are inherent in the processes known to the art. For example, previous attempts to dehydrogenate paraffin feedstocks used in such reactions have been unattractive because in order for the thermodynamics of hydrogen loss to become favorable, high temperatures must be employed. Thus, in the dehydrogenation of n-hexane to trans-2-hexene it is necessary to utilize elevated temperatures as high as approximately 1150° F. before the free energy of this conversion ceases to be positive. For example:

n-Hexane→trans-2-hexene+$H_2$ $\Delta F.°$ @ 800° F. (700° K.)=+6.5 kcal./mole
n-Hexane→trans-2-hexene+$H_2$ $\Delta F.°$ @ 900° F. (755° K.)=+4.9 kcal./mole
n-Hexane→trans-2-hexene+$H_2$ $\Delta F.°$ @ 1150° F. (894° K.)=+0.4 kcal./mole Other paraffin dehydrogenations also show a similar high temperature requirement, e.g.:

n-Dodecane→dodecene-1+$H_2$ $\Delta F.°$ @ 620° F. (600° K.)=+9.4 kcal./mole
n-Dodecane→dodecene-1+$H_2$ $\Delta F.°$ @ 900° F. (755° K.)=+4.9 kcal./mole
n-Dodecane→dodecene-1+$H_2$ $\Delta F.°$ @ 1160° F. (900° K.)=+0.4 kcal./mole If the hydrogenation is carried out at lower temperatures to avoid the cracking reaction and other side reactions resulting from high temperature utilization, then the free energy relationship becomes unfavorable and only limited conversions are obtained.

In order to overcome the foregoing limitations, it has also been proposed to employ supported metal catalysts which are normally associated with hydrogenation and/or dehydrogenation activity in the production of olefins by hydrogen transfer from hydrocarbon feedstocks to a hydrogen-accepting olefin. While these supported metals, such as nickel and palladium, initially appeared to be practical, further use thereof was precluded due to these metals catalyzing high consumptions of ethylene by undesirable disproportionation reactions. Examples of such disproportionation reactions are:

Ethylene→ethane+coke
Ethylene→methane+coke

The supported metals utilized as catalysts have been found to convert such large amounts of the ethylene in the feed by disproportionation that there was little or none available for its function as the hydrogen acceptor. Consequently, the olefin formation resulting from the reaction was negligible.

It is an object of the present invention, therefore, to provide a catalyst for use in a process for the transfer of combined hydrogen from one type of hydrocarbon to another type of hydrocarbon. Another object of this invention is to provide for the desired production of straight chain olefins from straight chain paraffins by means of hydrogen exchange causing a more favorable free energy of reaction at low temperatures. Other objects and advantages will be apparent from the subsequent disclosure.

The above objects are provided for in accordance with the present invention by a process which comprises reacting a hydrocarbon containing more than three carbon atoms with a hydogen-accepting olefin in the presence of an aluminosilicate catalyst containing cations of metals selected from Groups IB through VIII of the Periodic Table, said catalyst being effective in transferring hydrogen from the hydrocarbon to the olefin thereby forming an alkane corresponding to said olefin and an olefin of three or more carbon atoms. Accordingly, it has been observed that said desired production of straight chain olefins from straight chain paraffins is accomplished with a more favorable free energy of reaction, at low temperatures, by hydrogen exchange with a lower olefin, e.g., propylene and ethylene, and especially ethylene. With free energies of favorable magnitude quite advantageous equilibrium constants result at mild temperatures. Thus, in accordance with the present invention, it is now possible to convert paraffins to the desired olefins in high conversions, at low temperature, and with high selectivity.

The process of the present invention has wide application to the conversion of various types of hydrocarbons to the related hydrocarbon having at least one different carbon-to-carbon linkage and a higher carbon-to-hydrogen ratio. The upper limits of the number of carbon atoms present in the hydrocarbon employed as starting material is determined only by the operational feasibility thereof. Thus, the process of the present invention is applicable to both polymeric hydrocarbons, as well as monomeric hydrocarbons. With regard to the monomeric hydrocarbons, it is found that any acyclic aliphatic hydrocarbon can be suitably employed, the upper limit of the number of carbon atoms again being determined only by the operational feasibility thereof, but with the preferred upper limit being about 30 carbon atoms. While the aliphatic hydrocarbon employed must be essentially saturated in nature in order to be operable, it is found that the feed employed may also comprise saturated acyclic aliphatic hydrocarbons mixed with minor amounts of unsaturated acyclic aliphatic hydrocarbons. Thus, alkanes of at least three carbon atoms can be dehydrogenated to alkanes and/or alkadienes, e.g., isobutane, can be dehydrogenated to isobutene, n-butane to butene-1, butene-2 and butadiene-1-3 and n-pentane to corresponding pentenes and pentadienes. In addition, as mentioned, mixtures of alkanes with minor amounts of alkenes can be dehydrogenated, for example, n-butane when mixed with minor amounts of butene-1 and/or -2 can be dehydrogenated to butene-1, butene-2, and butadiene-1-3.

In accordance with the present invention, ethylene is the preferred hydrogen accepting olefin for use in the process thereof. For convenience of terminology, the term "hydrogen accepting olefin" is employed herein to designate an olefin suitable for accepting hydrogen in a conversion of a particular compound as determined by application of the theory of free energy changes. Thermodynamically, it is the most suitable one because at any given temperature the free energy change of the conversion of ethylene to ethane is a lower positive or greater negative number than for the corresponding conversion of any other olefin. Ethylene has further considerable advantages for use in the present invention, in that it and its hydrogenation product ethane are less subject to cracking than the olefins of higher molecular weight. Similarly, ethylene is less subject to ready conversion by any other reaction in the presence of catalyst than high molecular weight olefins which may be converted to more highly unsaturated compounds or cracked material by reaction in the presence of the foregoing catalyst and under the reaction conditions normally employed.

Propylene is also a suitable olefin for use in many reactions in accordance with the present invention, particularly when a compound desired is a hydrocarbon having a relatively greater number of carbon atoms, e.g. six or more carbon atoms. The free energy change for propylene is about four kilocalories greater, i.e. more positive than for ethylene at temperatures in the range employed in the present invention. Next to ethylene, however, propylene is preferably employed, but any other olefin such as butene-1, butene-2, isobutene and normal or branched pentene, hexene, or higher olefin may be employed provided that it meets the criterion of an acceptable free energy change.

The olefin employed as hydrogen acceptor need not be charged to the reaction in pure form. Mixtures of olefins, e.g., a mixture of ethylene-propylene stream may, therefore, be employed. The olefin may also be charged in admixture with hydrocarbons which are relatively inert under the reaction conditions, e.g., ethylene may be charged in admixture with methane and/or ethane. Since the effectiveness of the olefin as a hydrogen acceptor depends on the corresponding paraffin, the presence of the corresponding paraffin in the feed will tend to suppress this reaction and such paraffin is therefore preferably held to a relatively low concentration in the olefin charge stream. The olefin employed as hydrogen acceptor in the present process may be derived from any convenient source, e.g. thermal and catalytic cracking of petroleum hydrocarbons furnishes large amounts of olefins in most petroleum refineries. Ethylene may be recovered from cracked gases or may be produced and recovered by any of numerous known processes.

In accordance with the present invention, reaction is carried out over certain active aluminosilicate catalysts, i.e., the catalyst of the present invention, i.e., aluminosilicates containing from 0.5 to 1.0 equivalent of cations of metals selected from Groups IB through VIII of the Periodic Table per gram atom of aluminum are truly selective in that the above desired objects relative to favorable free energy of reaction and disproportionation suppression are accomplished. Furthermore, the catalyst used in the process of the instant invention are found to be extremely stable and can be used for protracted periods of time without apparent loss of activity.

The catalysts contemplated by the present invention are aluminosilicate compositions which are strongly acidic in character as a result of treatment with a fluid medium containing at least one metallic cation. Metallic salts broadly represent the source of metal cations. The product resulting from treatment with the fluid medium is an activated crystalline and/or amorphous aluminosilicate in which the nuclear structure thereof has been modified solely to the extent of having metallic cations chemisorbed or ionically bonded thereto. The activated aluminosilicate contains at least 0.5 equivalent and preferably contains more than 0.9 equivalent of one or more metal cations per gram atom of aluminum. Except for alkali metal cations which may be present as impurities to the extent of less than 0.25 equivalent per gram atom of aluminum, no other cations of metals of Group IA of the Periodic Table are associated with the aluminosilicates.

In preparing the catalyst composition, the aluminosilicate can be contacted with a non-aqueous or aqueous fluid medium comprising a gas, polar solvent or water solution containing at least one metallic salt soluble in the fluid medium. Water is the preferred medium for reasons of economy and ease of preparation in large scale operations involving continuous or batchwise treatment. Similarly, for this reason, organic solvents are less preferred but can be employed providing the solvent permits ionization of the metallic salt. Typical solvents include cyclic and acyclic ethers such as dioxane, tetrahydrofuran, ethyl ether, diisopropyl ether, and the like; ketones such as acetone and methyl ethyl ketone; esters such as ethyl acetate, propyl acetate; alcohols such as ethanol, propanol, butanol, etc.; and miscellaneous solvents such as dimethylformamide, and the like.

In carrying out the treatment with the fluid medium, the procedure employed comprises contacting the aluminosilicate with the desired fluid medium until such time as metallic cations originally present in the aluminosilicate are virtually exhausted. Cations of metals of Group IA of the Periodic Table, if present in the modified aluminosilicate, tend to suppress or limit catalytic properties, the activity of which, as a general rule, decreases with increasing content of these metallic cations. Effective treatment with the fluid medium to obtain a modified aluminosilicate having high catalytic activity will vary, of course, with the duration of the treatment and temperature at which it is carried out. Elevated temperatures tend to hasten the speed of treatment whereas the duration thereof varies inversely with the concentration of the ions in the fluid medium. In general, the temperatures employed range from ambient room temperature of 70° F., or below, up to temperatures of about 200° F. Following the fluid treatment, the treated aluminosilicate is washed with water, preferably distilled or deionized water, until the effluent wash water has a pH value of wash water, i.e., between about 5 and 8. The aluminosilicate material is thereafter analyzed for metallic ion content by methods well known in the art. Analysis also involves analyzing the effluent wash for anions obtained in the wash as a result of the treatment as well as determination of and correction for anions that pass into the effluent wash from soluble substances or decomposition products of insoluble substances which are otherwise present in the aluminosilicate as impurities.

The actual procedure employed for carrying out the fluid treatment of the aluminosilicate may be accomplished in a batchwise or continuous method under atmospheric, subatmospheric or superatmospheric pressure. A solution of the ions of positive valence in the form of a molten material, vapor, aqueous or non-aqueous solution may be passed slowly through a fixed bed of the aluminosilicate. If desired, hydrothermal treatment or a corresponding non-aqueous treatment with polar solvents may be effected by introducing the aluminosilicate and fluid medium into a closed vessel maintained under autogenous pressure. Similarly, treatments involving fusion or vapor phase contact may be employed providing the melting point or vaporization temperature of the exchange salt is below the decomposition temperature of the aluminosilicate.

A wide variety of metallic compounds can be employed with facility as a source of metallic cations and include both inorganic and organic salts of the metals of Group IB through Group VIII of the Periodic Table.

Representative of the salts which can be employed include chlorides, bromides, iodides, carbonates, bicarbonates, sulfates, sulfides, thiocyanates, dithiocarbamates, peroxysulfates, acetates, benzoates, citrates, fluorides, nitrates, nitrites, formates, propionates, butyrates, valerates, lactates, malonates, oxalates, palmitates, hydroxides, tartrates and the like. The only limitations on the particular metal salt or salts employed are that it be soluble in the fluid medium in which it is used. The preferred salts are the chlorides, nitrates, acetates and sulfates.

A wide variety of metallic salts can be employed, including salts of trivalent, divalent, and monovalent metals. Of the divalent metals, the preferred ones are of Group IIA of the Periodic Table. Also contemplated are the rare earth metals including cerium, lanthanum, praseodymium, neodymium, illium, samarium, europium, gadolinium, terbium, dysprosium, holmium, erbium, thallium, ytterbium and lutetium.

Representative metals salts which can be employed include silver chloride, silver sulfate, silver nitrate, silver acetate, silver arsenate, silver bromide, silver citrate, silver carbonate, silver oxide, silver tartrate, calcium acetate, calcium benzoate, calcium bromide, calcium nitrate, calcium chloride, calcium citrate, beryllium chloride, beryllium carbonate, beryllium hydroxide, beryllium sulfate, barium acetate, barium bromide, barium citrate, barium malonate, barium nitrite, barium oxide, barium sulfide, magnesium chloride, magnesium bromide, magnesium sulfate, magnesium sulfide, magnesium acetate, magnesium formate, magnesium stearate, magnesium tartrate, zinc sulfate, zinc nitrate, zinc acetate, zinc chloride, zinc bromide, aluminum chloride, aluminum bromide, aluminum acetate, aluminum citrate, aluminum nitrate, aluminum oxide, aluminum phosphate, aluminum sulfate, titanium bromide, titanium chloride, titanium nitrate, titanium sulfate, zirconium chloride, zirconium nitrate, zirconium sulfate, chromic acetate, chromic chloride, chromic nitrate, chromic sulfate, ferric chloride, ferric bromide, ferric acetate, ferrous chloride, ferrous arsenate, ferrous lactate, ferrous sulfate, nickel chloride, nickel bromide, cerous acetate, cerous bromide, cerous carbonate, cerous chloride, cerous iodide, cerous sulfate, cerous sulfide, lanthanum chloride, lanthanum bromide, lanthanum nitrate, lanthanum sulfate, lanthanum sulfide, yttrium bromate, yttrium bromide, yttrium chloride, yttrium nitrate, yttrium sulfate, samarium acetate, samarium chloride, samarium bromide, samarium sulfate, neodymium chloride, neodymium oxide, neodymium sulfide, neodymium sulfate, praseodymium chloride, praseodymium bromide, praseodymium sulfate, praseodymium sulfide, etc.

The aluminosilicates treated in accordance with the invention include a wide variety of aluminosilicates both natural and synthetic, which have an amorphous or preferably either a crystalline structure or a combination of crystalline and amorphous. These aluminosilicates can be described as a three dimensional framework of $SiO_4$ and $AlO_4$ tetrahedra in which the tetrahedra are cross-linked by the sharing of oxygen atoms whereby the ratio of the total aluminum and silicon atoms to oxygen atoms is 1:2. In their hydrated form the aluminosilicates may be represented by the formula:

$$M_{2/n}O:Al_2O_3:wSiO_2:yH_2O$$

wherein M is a cation which balances the electrovalence of the tetrahedra, $n$ represents the valence of the cation, $w$ the moles of $SiO_2$ and $y$ the moles of $H_2O$. The cation can be any one or more of metal ions depending on whether the aluminosilicate is synthesized or occurs naturally. Typical cations include sodium, lithium, potassium, silver, magnesium, calcium, zinc, barium, iron and manganese. Although the proportions of inorganic oxides in the silicates and their spatial arrangement may vary, effecting distinct properties in the aluminosilicates, the two main characteristics of these materials are the presence in their molecular structure of at least 0.5 equivalent of an ion of positive valence per gram atom of aluminum, and an ability to undergo dehydration without substantially affecting the $SiO_4$ and $AlO_4$ framework. In this respect, these characteristics are essential for obtaining catalyst compositions of high activity in accordance with the invention.

Representative, but non-limiting, materials include synthesized cyrstalline aluminosilicates, designated Zeolite X, which can be represented in terms of mole ratios of oxides as follows:

$$1.0 \pm 0.2 M_{2/n}O:Al_2O_3:2.5 \pm 0.5 SiO_2:yH_2O \qquad (1)$$

wherein M is a cation having a valence of not more than three, $n$ represents the valence of M, and $y$ is a value up to eight depending on the identity of M and degree of hydration of the crystal. The sodium form may be represented in terms of mole ratios of oxides as follows:

$$0.9 Na_2O:Al_2O_3:2.5 SiO_2:6.1 H_2O \qquad (2)$$

Another synthesized crystalline aluminosilicate, and a preferred form designated Zeolite YA, can be represented in mole ratios of oxides as:

$$0.9 \pm 0.2 Na_2O:Al_2O_3:wSiO_2:yH_2O \qquad (3)$$

wherein $w$ is a value ranging from 3 to 6 and $y$ may be any value up to about 9.

Among the naturally occurring crystalline aluminosilicates which can be employed for purposes of the invention are included levynite, dachiardite, erionite, faujasite, analcite, pauligite, noselite, ferriorite, heulandite, scolecite, stibite, clinoptilolite, harmotome, phillipsite, brewsterite, flakite, datolite, and the like.

Other aluminosilicates which can be used are caustic treated clays. Of the clay material montmorillonite and kaolin families are representative types which include the subbentonites, such as bentonite and the kaolins, commonly identified as Dixie McNamee, Georgia and Florida clays in which the main mineral constituent is halloysite, kaolinite, dicite, nacrite, or anauxite.

As previously noted, the active aluminosilicates used for purposes of the invention are characterized as having at least 0.5 equivalent of an ion of positive valence per gram atom of aluminum as determined by base exchanging with other cations by recognized techniques. Aluminosilicate starting materials not possessing this characteristic, however, may be employed providing they are either pretreated or acquire this characteristic as a result of treatment with the fluid medium. As an example of pretreatment, argillaceous materials contacted with caustic or caustic-silica mixtures as above-described, results in the formation of amorphous and/or crystalline aluminosilicates having at least 0.5 equivalent, usually about 1.0 equivalent, of cation per gram atom of aluminum.

As has heretofore been pointed out, the novel compositions of this invention are aluminosilicates which contain from 0.5 to 1.0 equivalent per gram atom of aluminum of ions of positive valence selected from Groups IB through VIII of the Periodic Table. Except for alkali metal cations which may be present as impurities to the extent of less than 0.25 equivalent per gram atom of aluminum, no cations of metals of Group IA of the Periodic Table are associated with the aluminosilicates.

Within the above limits of the novel aluminosilicates of this invention, it is preferred that there be no alkali metal associated with the aluminosilicates, since the presence of these metals tends to suppress or limit catalytic properties, the activity of which, as a general rule, decreases with increasing content of alkali metal cations. It is also preferred that the novel aluminosilicates have between 0.8 and 1.0, more preferably 1.0, equivalent per gram atom of aluminum of the ions of positive valence previously set forth.

Additionally, it is preferred that the metal cation or cations be present in an amount of from 40–85% of the total equivalents of ions of positive valence contained in the novel aluminosilicates of the instant invention. More preferably, the metal cation or cations should be present in an amount from 50–75% with from 75–85% being particularly preferred.

Therefore, the most preferred embodiment of this invention is an aluminosilicate containing 1 equivalent of ions of positive valence, said ions consisting of from 0.75 to 0.85 equivalent of cations of at least one metal as defined above.

The catalysts of this invention may be used in powdered, granular or molded state formed into spheres of pellets of finely divided particles having a particle size of 2 to 500 mesh. In cases where the catalyst is molded, such as by extrusion, the aluminosilicate may be extruded before drying, or dried or partially dried and then extruded. The catalyst product is then preferably pre-calcined in an inert atmoshpere near the temperature contemplated for conversion but may be calcined initially during use in the conversion process. Generally, the aluminosilicate is dried between 150° F. and 600° F. and thereafter calcined in air or an inert atmosphere of nitrogen, hydrogen, helium, flue gas or other inert gas at temperatures ranging from about 500° F. to 1500° F. for periods of time ranging from 1 to 48 hours or more.

It has been further found in accordance with the invention that catalyst of improved activity and having other beneficial properties are obtained by subjecting the treated aluminosilicate to a mild stream treatment carried out at elevated temperatures of 800° F. to 1500° F. and preferably at temperatures of about 100° F. to 1300° F. The treatment may be accomplished in an atmosphere of 100 percent steam or in an atmosphere consisting of steam and a gas which is substantially inert to the aluminosilicate. The steam treatment apparently provides beneficial properties in the aluminosilicate.

The conditions suitably employed in the hydrogen transfer process of the present invention depend on the particular compound to be converted, the compound selected as the hydrogen accepting olefin, the catalyst employed, as well as the hydrocarbon desired to be obtained as the principal product. In the conversion of saturated hydrocarbons to their corresponding olefins, the temperature required is generally between at least 200° F. and 750° F., and preferably is in the range between 250° F. and 500° F., although higher temperatures may be utilized if desired. The higher temperatures are not objectionable as long as other undesirable changes are not effected. However, excessively high temperatures are not required in order to effect suitable dehydrogenation in the presence of a catalyst utilized in accordance with this invention and the hydrogen accepting olefin. The process is suitably carried out at various pressures of from subatmospheric to superatmospheric pressures, in either the liquid or the vapor phase depending on the particular hydrocarbons being employed, for example, the lower molecular weight feed, e.g. $C_3$–$C_{16}$ alkanes being more suitably reacted in the vapor phase. Although atmospheric pressure is suitable and is advantageous in most cases, other considerations such as factors which are involved in the separation or recovery of the hydrocarbon products from the reactor effluent stream make superatmospheric most desirable in most cases. Thus, the pressure can be at any value at which reactants are sufficiently heated to a temperature at which the hydrocarbon is substantially thermally stable. The pressure employed is preferably in a range of between 1 and 12 atmospheres, but may be higher.

The residence time of the reactants at the selected reaction conditions also depends on the particular hydrocarbon reactant, the hydrogen-accepting olefin in the reaction mixture, the catalyst utilized, the temperature and pressure employed, and the nature of the dehydrogenation product. In general, it should be at least about 1 seconds and usually it should not be over about 3 minutes. With most common reactants dehydrogenation is very rapid so that a residence time of from 5 to 20 seconds suffices and is, therefore, preferred.

The ratio of hydrogen-accepting olefin to hydrocarbon to be converted in the present reaction, which may be designated as "hydrogen donor hydrocarbons," may be varied over a wide range. This ratio may be expressed by the mole ratio of the hydrogen-accepting olefins to the hydrogen donor. The mole ratio of hydrogen-accepting olefins to the hydrogen donor employed may suitably vary from 0.15 to 1.5 and is preferably in a range between 0.25 and 0.55. In selecting a ratio of hydrogen-accepting olefin to the hydrogen donor, it is generally preferred not to exceed a mole ratio of olefin to donor of about 1.0.

The particular apparatus used in carrying out the hydrogen transfer step forms no part of the present invention. The process is conveniently carried out in a fixed bed system similar to those well known to the art.

In applying the process of the present invention to the production of desirable olefins, e.g. butene, it is only necessary to pass proportioned mixtures of butane with ethylene through beds of this selected granular catalytic material which is contained in the reaction zone utilized. The reaction zone employed may suitably be a heated vessel or coil which is maintained at a temperature in the range set forth above, e.g., between about 250° F. and 750° F. The feed, i.e. the combined butane-ethylene feed is added to the reactor, preferably at a gas flow rate of about 150 v./v./hr. The feed of butane and ethylene is so adjusted that the feed comprises about 70 mole percent of butane and about 30 mole percent of ethylene. The mixture of butane and ethylene may be preheated if desired, prior to its introduction into the reaction zone. The stream of butane and ethylene is maintained in the reactor at the foregoing temperatures for a period of from about three seconds to three minutes whereafter the reactor effluent is withdrawn and is suitably passed to a fractionator. The materials introduced into the fractionator are fractionally distilled so as to recover desired fractions. Thus, minute quantities of methane and hydrogen formed during the reaction, as well as the ethane resulting from the hydrogen transfer and any unreacted ethylene, is separated from the desired hydrocarbon product. The total hydrocarbon product is suitably subjected to further workup including separation of unconverted butane from said reaction products. This butane, so separated, may be recycled back to reaction zone, if desired. Similarly, the ethylene resulting from the separation may also be recycled for further use in the process, while the ethane component may be discarded from the system or it may be processed for new use by introduction into a cracking zone which is operated at a temperature of approximately 1500° F. with a very short residence time to produce a mixture of ethane and ethylene. The ethylene so produced thus may also be recycled back to the system for further use.

In order to indicate the novelty and utility of the present invention, the following examples are given of specific methods of operation of the process which employ the preferred conditions of temperature and pressure and flow rate, as well as preferred feedstock and catalyst. These examples are merely illustrative of results normally obtained and should not be construed as a limiting feature of the invention as various changes and modifications apparent to those in the art may be made in reaction conditions employed.

EXAMPLE 1

The following example is presented in order to illustrate that by exchanging the aluminosilicate material, e.g., faujasite, olefin formation becomes significantly favorable. In this example, the feed employed was a blend of 90 mole percent of $C_8$ paraffinic stock and 10 mole percent of $C_8$ cyclic olefin fed into the reaction zone at a feed rate of 0.4 w./w./hr. Said mixture was passed at atmospheric pressure and a temperature of 300° F. over a catalyst comprising a synthetic faujasite having a silica to alumina ratio of 4.2 and exchanged as represented in the table below. The results of such experiment which are presented as the percentage yield of olefin product illustrate a comparison of the use of catalysts which were exchanged with cations other than Groups IA through VIII with catalysts which were exchanged in accordance with the present invention.

*Evaluation of cationic exchanged faujasites as hydrogen transfer catalysts*

[300° F.; atm. pressure; 0.4 w./w./hr.]

| Test No. | 1 | 2 | 3 | 4 | 5 | 6 |
|---|---|---|---|---|---|---|
| Faujasite Cation | Na | K | Rb | Ag | Sr | Cd |
| Periodic Group | I-A | I-A | I-A | I-B | II-A | II-B |
| Hydrocarbon Product, Percent Olefins | 99.0 | 99.0 | 99.0 | 0 | 0 | 0 |

These data show that the metals of Group I-A, such as the unexchanged sodium faujasite or the potassium or rubidium forms, do not promote hydrogen transfer while silver, strontium, and cadmium-exchanged faujasites show excellent conversion at temperatures as low as 300° F. The necessity of the use of the properly-exchanged catalyst is thus believed evident from such runs.

It is to be understood that this invention is capable of many modifications and is not to be limited by the foregoing examples but only by the following claims.

What is claimed is:

1. The process which comprises reacting a hydrocarbon containing more than 3 carbon atoms with a hydrogen-accepting olefin in the presence of an aluminosilicate catalyst containing cations of metals selected from Groups IB through VIII of the Periodic Table, said catalyst being effective in transferring hydrogen from the hydrocarbon to the olefin thereby forming an alkane corresponding to said olefin, and an olefin of more than 3 carbon atoms.

2. The process of claim 1 in which the catalyst is a crystalline aluminosilicate having an ordered crystalline structure having from 0.5 to 1.0 equivalent per gram atom of aluminum of cations of metals selected from Groups IB through Group VIII of the Periodic Table, said metal cations being associated with the aluminosilicate as a result of base exchange.

3. The process of claim 1 in which the hydrogen-accepting olefin is ethylene.

4. In a process for converting a first hydrocarbon containing at least 3 carbon atoms per molecule and containing non-aromatic carbon-to-hydrogen bonds into at least a second hydrocarbon having a higher carbon-to-hydrogen ratio which comprises contacting a mixture comprising said first hydrocarbon with a hydrogen-accepting olefin having a lower carbon number than said first hydrocarbon in a reaction zone at a temperature of about 200 to 750° F. to effect a carbon-to-hydrogen bond cleavage in said first hydrocarbon and conversion of at least part of said olefin to the corresponding paraffin and recovering said first hydrocarbon, the improvement which comprises effecting said contacting in the presence of an aluminosilicate catalyst containing cations of metals selected from Groups IB through VIII of the Periodic Table.

5. The process of claim 4 in which the catalyst is a crystalline aluminosilicate having an ordered crystalline structure having from 0.5 to 1.0 equivalent per gram atom of aluminum of cations and metals selected from Groups IB through Group VIII of the Periodic Table, said metal cations being associated with the aluminosilicate as a result of base exchange.

6. The process of claim 5 in which the metal is silver.

7. The process of claim 5 in which the metal is strontium.

8. The process of claim 5 in which the metal is cadmium.

9. A process for converting a first hydrocarbon containing from 3 to about 16 carbon atoms per molecule and containing non-aromatic carbon-to-hydrogen bonds into at least a second hydrocarbon having a higher carbon-to-hydrogen ratio which comprises contacting a vapor mixture comprising said first hydrocarbon with ethylene in a reaction zone in the presence of an aluminosilicate catalyst containing cations of metals selected from Groups IB through VIII of the Periodic Table at a temperature of about 200° to 750° F. to effect a carbon-to-hydrogen bond cleavage in said first hydrocarbon and the conversion of at least part of said ethylene to ethane and recovering said first hydrocarbon.

10. The process of claim 9 in which the catalyst is a faujasite having from 0.5 to 1.0 equivalent per gram atom of aluminum of cations of metals selected from Groups IB through Group VIII of the Periodic Table, said metal cations being associated with the aluminosilicate as a result of base exchange.

11. The process of claim 9 wherein the metal cations are 40 to 85 percent of the total equivalents of ions of positive valence associated with the crystalline aluminosilicate.

References Cited by the Examiner

UNITED STATES PATENTS 3,106,590  10/1963  Bittner _____ 260—683.3

DELBERT E. GANTZ, *Primary Examiner.*

G. E. SCHMITKONS, *Assistant Examiner.*